United States Patent
Hsieh et al.

(10) Patent No.: US 6,721,030 B2
(45) Date of Patent: Apr. 13, 2004

(54) SPONTANEOUS ALIGNMENT METHOD FOR MANUFACTURING CHOLESTERIC REFLECTIVE POLARIZER

(75) Inventors: Pao-Ju Hsieh, Hsin-Chu Hsien (TW); Hui-Lung Kuo, Hsin-Chu Hsien (TW); Ping-Yao Wu, Hsin-Chu Hsien (TW); Wen-Bing Chu, Hsin-Chu Hsien (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 24 days.

(21) Appl. No.: 10/237,789

(22) Filed: Sep. 10, 2002

(65) Prior Publication Data

US 2003/0206259 A1 Nov. 6, 2003

(30) Foreign Application Priority Data

May 1, 2002 (TW) .................................. 91109054 A

(51) Int. Cl.⁷ .................................................. G02F 1/13
(52) U.S. Cl. ...................................................... 349/191
(58) Field of Search ................................ 349/191, 185, 349/187, 189

(56) References Cited

U.S. PATENT DOCUMENTS 6,331,881 B1 * 12/2001 Hatano et al. ................. 349/86
6,331,884 B1 * 12/2001 Masazumi et al. .......... 349/156
6,583,848 B2 *  6/2003 Hashimoto et al. ......... 349/187

* cited by examiner

*Primary Examiner*—Kenneth Parker
(74) *Attorney, Agent, or Firm*—Bacon & Thomas, PLLC

(57) ABSTRACT

To form a brightness enhancement film of cholesteric liquid crystal, a photopolymerizable liquid crystal is first formed on a first substrate. A second substrate then is formed on the liquid crystal substance to form a sandwich structure. The sandwich structure is subsequently submitted to a lamination process that generates shear stress thereon. Finally, an energetic irradiation including UV irradiation is performed to solidify the layer of liquid crystal into a liquid crystal polymer film. The second substrate then is selectively removed. The above steps are repeated until a desired reflected wavelength range of the liquid crystal film is obtained.

8 Claims, 3 Drawing Sheets

SPONTANEOUS ALIGNMENT METHOD FOR MANUFACTURING CHOLESTERIC REFLECTIVE POLARIZER

FIELD OF THE INVENTION

The invention relates to a method for manufacturing cholesteric reflective polarizer that can be used in LCD devices.

BACKGROUND OF THE INVENTION

The overall light efficiency of a typical LCD is so low only around 4%–6% of the brightness provided by the back light module unit. Every of constructing components of an LCD more or less will block part of light from back light module unit, such as the dichroic polarizer, color filters, or pixel aperture. LCDs rely on polarized light, however the dichroic transmittance of a regular polarizer is only around 40% and the rest part of light is absorbed by the polarizer itself. Therefore, a brightness enhancing-method by using cholesteric reflective polarizer is proposed. It is well-known that cholesteric liquid crystals are characterized with its chirality and molecular helical structure. It can selectively reflect certain circularly polarized light but not absorbing it. This is obviously different from regular dichroic polarizers. As known, cholesteric liquid crystal will reflect the circular polarized light of the same handedness to its helix, and let the circularly polarized light of opposite handedness pass through the film. By means of a simple reflection surface, the reflected light from the cholesteric liquid crystal film can be easily changed its handedness and passed through the film again. Therefore, the originally reflected light is redirected back to the film, resulted in theoretically a double intensity light with the same circular polarization. The light efficiency is then doubly increased. Furthermore, through a ¼-wavelength retardation film, the circularly polarization can be transformed into linearly polarization which can then be used in LCDs.

Typically, cholesteric reflective polarizer can be fabricated by "one-layer" method or by "multi-layer" method. The former deals with a whole visible light region via a single cholesteric layer. That is, there should be an adequate variation of the helical pitch of the cholesteric liquid crystal in the thickness direction within the layer. As disclosed in U.S. Pat. Nos. 5,506,704, 5,691,789, 6,099,758, 6,057,008, and 6,071,438, the variation of the helical pitch should be achieved via a long-term low-energy exposure. Thereby, the helical pitch in the thickness direction is varied progressively. However, a long-time exposure should be problematic in mass production. Although U.S. Pat. Nos. 5,948,831 or 6,193,937 discloses the use of a laser for detecting the reaction stop point, but the time required is still substantially long and therefore is difficult to implement. Furthermore, in order to produce a substantial variation of the helical pitch within a typically 20~30 µm-thick film, an exposure system that can provide ultra-low energy is required. Unfortunately, exposure systems commercially available have a power that is excessively high with respect to the entire structure. Therefore, the disclosure of the above-mentioned patents further calls for the necessary use of a UV-region neutral-density filter to reduce the power to ⅟30. However, this neutral-density filter is excessively expensive and, furthermore, a long-term exposure operation under the above high-powered system can be problematic to the shelf life.

Therefore, considering the convenience of mass production, the multi-layer method seems to be a better solution. As disclosed in U.S. Pat. No. 6,016,177, a method for producing a circularly polarized separated plate which comprises coating an oriented cholesteric liquid crystal polymer layer with a different kind of cholesteric liquid crystal polymer and heat orienting the resulting coated layer, to provide multistage changes in helical pitch in the direction of thickness. As disclosed in the above-mentioned patent, the pre-polymerized polymer solution was first coating on a plastic substrate which has been already aligned treatment. After the solvent is evaporated, the orientation of cholesteric liquid crystal is achieved by thermal annealing for a while where the annealing temperature is within a range between the glass transition temperature $T_g$ and the isotropic phase transition temperature. Thereafter, the temperature is decreased to under $T_g$ to freeze the orientation structure. This method has several constraints. For example, the glass transition temperatures of the polymers must be higher than the ambient temperature. As disclosed in U.S. Pat. No. 6,016,177, with respect to a 2~6 layers lamination, the further conditions are not considered similar: a next layer of coating is directly coated on a previous already oriented layer of polymers, and the new orientation conditions would interfere to the already obtained orientation result. Moreover, the temperature can easily affect the orientation effect. This method therefore needs to be improved. Furthermore, the lamination process, used to stack several layers and to fix the orientation of the layers, usually requires the use of laminating rollers. The temperature of the laminating roller also plays an important role on the orientation of the film. Furthermore, as mentioned, the high-temperature annealing is performed around 130° C. to 160° C. for 3~20 min of operation, which may be problematic for the choice of the plastic substrates.

It is well known that the degree of orientation affects the performance of the brightness enhancement film. As disclosed in U.S. Pat. No. 5,599,412, a known method of producing aligned cholesteric liquid crystal inks. It firstly submits the cholesteric liquid crystal polymer to a hot molten state. Thereafter, the cholesteric liquid crystal polymer is directly coated on a conveyor belt (without alignment layer). Then, a perfect orientation is achieved via an electric field or a magnetic field. However, the maintenance of a steady electric/magnetic field is practically not convenient.

SUMMARY OF THE INVENTION

It is therefore a principal object of the invention to provide a spontaneous alignment method for manufacturing cholesteric reflective polarizer that can increase the brightness of a LCD device without the need of a specific alignment layer or mechanic rubbing to generate an adequate orientation of the cholesteric liquid crystal.

It is another object of the invention to provide a spontaneous alignment method for manufacturing cholesteric reflective polarizer in which photopolymerizable monomers or oligomers are used as starting substances that are formulated with photo-initiator and solvents directly used in the coating process, so that no preliminary polymerization is needed.

To accomplish the above and other objectives, the method of the invention first provides a first substrate. A photopolymerizable liquid crystal is formed on the first substrate. A second substrate then is formed on the liquid crystal substance to form a sandwich structure. The sandwich structure is subsequently submitted to a lamination process that generates shear stress thereon. Finally, an energetic irradiation including UV irradiation is performed to solidify the layer of liquid crystal into a liquid crystal polymer film. The second substrate then is selectively removed. The above steps are repeated until a desired reflected wavelength range is obtained.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1A:
FIG. 1A through FIG. 1F are schematic views illustrating various stages in the method of the invention.
Figure 1B:
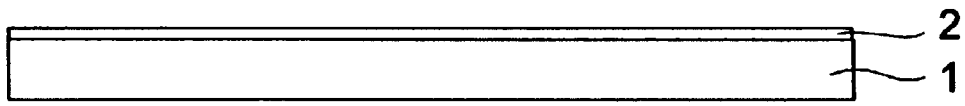
Figure 1C:
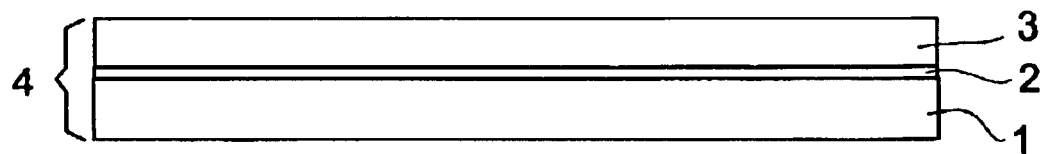
Figure 1D:
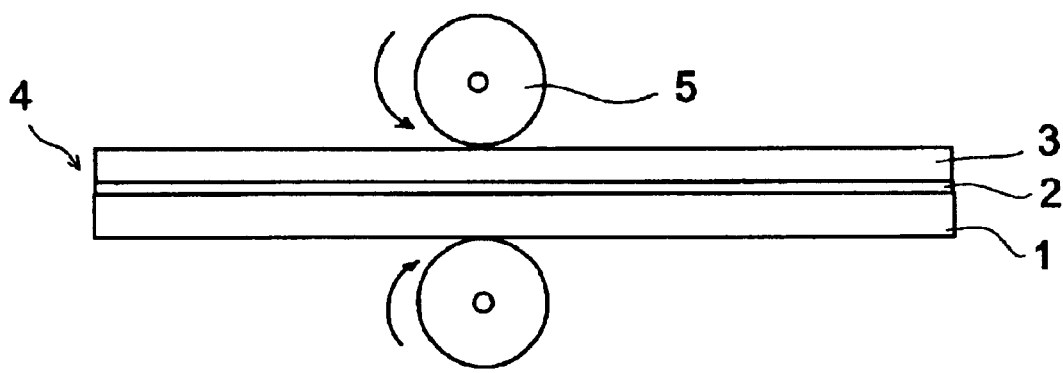
Figure 1E:
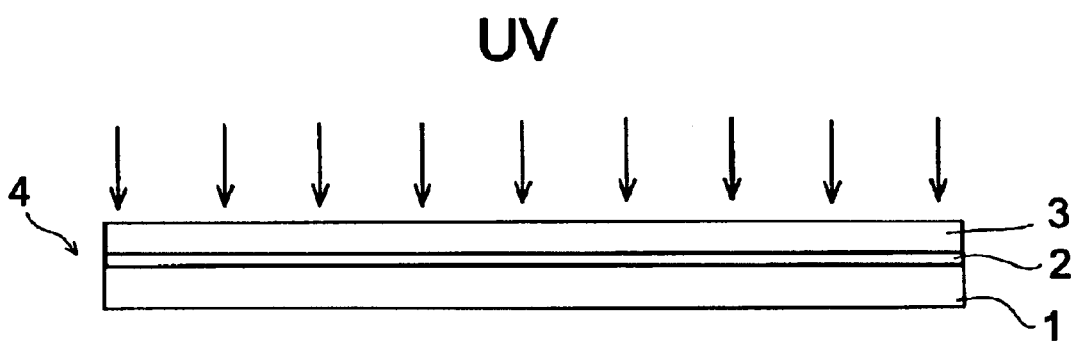
Figure 1F:
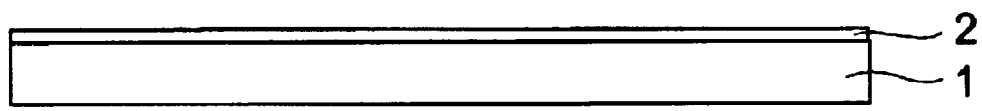

Wherever in the following description, like reference numerals will refer to like elements and parts unless otherwise illustrated.

A principal object of the invention is to provide a method of forming a brightness enhancement film made of self-oriented cholesteric liquid crystal. With reference to FIG. 1A through FIG. 1F, an embodiment of the method of the invention comprises the following steps:

(1) providing a first substrate 1;

(2) forming a photopolymerizable liquid crystal substance 2 (in a liquid crystal state) on the first substrate 1;

(3) covering the liquid crystal substance 2 with a second substrate 3, thereby forming a sandwich structure 4;

(4) performing a lamination process that generates shear stress on the sandwich structure 4;

(5) solidifying the oriented liquid crystal film 2 into a liquid crystal polymer film via energetic irradiation (such as UV irradiation);

(6) selectively removing the second substrate 3, the selective removal being performed when step (7) is to be performed, otherwise the second substrate 3 can be indifferently either removed or kept; and (7) repeating steps (2)~(6) until a desired reflected wavelength range is obtained.

In the above method, the photopolymerizable liquid crystal substance 2 refers to a single liquid crystal compound or a liquid crystal mixture with cholesteric liquid crystal phase. However, all the substances need not have the property of being photopolymerizable, and otherwise can be oligomers. The liquid crystal state of the liquid crystal substance 2 is within a range of about 10° C.~160° C., this liquid crystal state can be maintained via a hot melting treatment. The first substrate 1 is either a highly transparent film or a compensation film. The first substrate 1 and the second substrate 3 can be made of either a same material or different materials. Furthermore, considering the further removal of the second substrate 3, the second substrate 3 could be chosen as a release material. Or for compensating the optical properties' sake, the second substrate 3 could be a retardation film.

The liquid crystal substance 2 is formed on the first substrate 1 via a slot die or a roll coating method. The second substrate 3 then is attached over the liquid crystal substance 2 to form a sandwich structure 4. Then pass them through the rollers 5 where upper and lower rolls are in counter directions (see FIG. 1D) and maintained at a certain temperature to keep the liquid crystal 2 staying in a liquid crystalline state. With the shear stress generated by the opposite rotation of the rollers 5, the liquid crystal molecules at the upper and lower surfaces of the layer 2 within the sandwich structure 4 are therefore oriented, due to the viscous nature of cholesteric liquid crystal, then grandjean orientation will be achieved. That is, the upper and lower surfaces of the liquid crystal 2 are therefore imposed to be parallel orientation, the inner portion of liquid crystal 2 is spontaneously rotated to a helix structure. Furthermore, through the lamination of the rollers, the film is denser, and oxygen which causes undesirable interference with the polymerization is removed. Moreover, the spacing between the rollers 5 can give the liquid crystal layer 2 a slight control on thickness. Thereafter, the sandwich structure 4 is subject to energetic irradiation such as UV irradiation, to entirely solidify the oriented polymerizable substances, i.e. freezing a film of cholesteric phase liquid crystal polymer. Finally, the second substrate 3 can be selectively removed. Via the different reflected wavelength range of the cholesteric phase liquid crystal film 2, the above steps are repeated several times to achieve a brightness enhancement film of cholesteric liquid crystal.

A specific example of fabrication of a 25 μm-thick cholesteric liquid crystal film is now detailed in accordance with the method described above with reference to FIG. 1A through FIG. 1F.

The first substrate 1 is a 80 μm-thick layer made of TAC. The photopolymerizable liquid crystal substance 2 is warmed to 80° C., to a rubbery state. Via a slot die or roll coating, the photopolymerizable liquid crystal substance 2 is formed on the first substrate 1. In this example, the photopolymerizable liquid crystal substance 2 is made of CC4039L at 49.5%, CC4070L at 49.5% (i.e. acrylic silicon type liquid crystal manufactured by the company Wacker Chemie), and 907 at 1% (i.e. the photo-initiator manufactured by the company Ciba-Giegy).

The second substrate 3 then is attached on the photopolymerizable liquid crystal substance 2 to form the sandwich structure 4. The second substrate 3 can be made of a release material. Once achieved, if the second substrate 3, can be a compensation film, a retardation film, or a passivation film.

The sandwich structure 4 is submitted to a lamination process generating shear stress through rollers 5, wherein the spacing between rollers 5 is about 170 μm, the range of moving speed of the substrates is about 0.1 cm/min to 5 m/min. In the present example, a linear speed of 0.5 m/min is chosen, and the temperature of the rollers 5 is 80° C.

Figure 2:
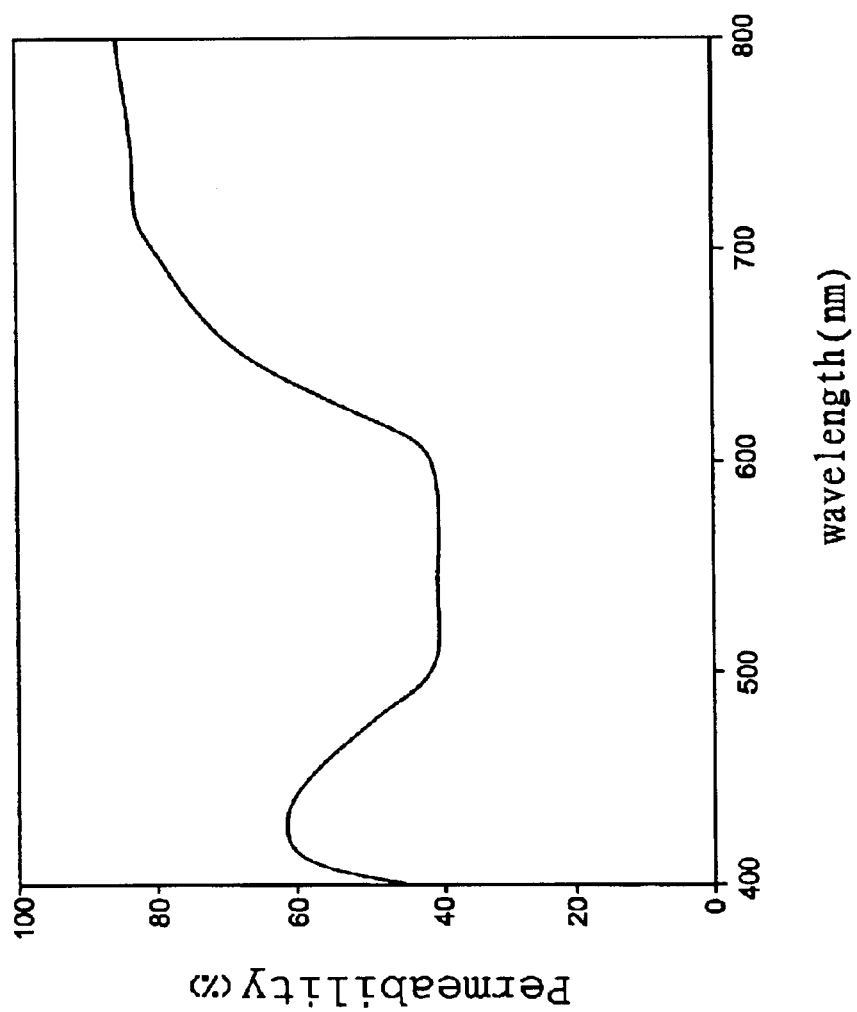
FIG. 2 is a graph of the transmittance of a cholesteric reflective polarizer of the present invention plotted as a function of wavelength.

Via energetic irradiation such as UV (UV-A or UV-B) irradiation, the oriented liquid crystal layer 2 is solidified into a film of liquid crystal polymer. FIG. 2 is a graph of the transmittance of a cholesteric reflective polarizer of the present invention plotted as a function of wavelength. It is obvious that the cholesteric liquid crystal is spontaneously oriented according to the characteristic of the transmittance around 42% within the range of 500–600 nm, the flat line shows the parallel orientation of cholesteric liquid crystal achieved. Therefore, the transmittance within this range of the wavelength, the light is half transmitted, and reflected the other half.

If the reflected wavelength range is expected to be further extended, the second substrate 3 can be removed to repeat the previous steps for different formulations until the desired reflected wavelength range is achieved. Otherwise, the second substrate 3 may be either removed or kept according to the functional requirement.

The advantages of the invention therefore are as follows:

(1) the substrates used do not need an orientation treatment, such as alignment layer or mechanical rubbing;

(2) the photopolymerizable substances used can be polymerized within the method of the invention without preliminary polymerization process;

(3) the orientation of the monomers or oligomers is even easier to accomplish than the orientation of the polymers.

It should be apparent to those skilled in the art that the above description is only illustrative of specific embodiments and examples of the invention. The invention should therefore cover various modifications and variations made to the structure and operations of the invention as described herein, provided they fall within the scope of the invention as defined in the following appended claims.

What is claimed is:

1. A spontaneous alignment method for manufacturing cholesteric reflective polarizer, comprising:

(1) providing a first substrate;

(2) forming a photopolymerizable liquid crystal substance on the first substrate, the photopolymerizable liquid crystal substance being within in a liquid crystal state;

(3) covering the liquid crystal substance with a second substrate, thereby forming a sandwich structure;

(4) performing a lamination process that generates shear stress on the sandwich structure;

(5) solidifying the oriented liquid crystal into a liquid crystal polymer film via energetic irradiation including UV irradiation;

(6) selectively removing the second substrate, the selective removal being performed when step (7) is to be performed, otherwise the second substrate is either removed or kept as desired; and (7) repeating steps (2)~(6) until a desired reflected wavelength range is obtained.

2. The method of claim 1, wherein the first substrate is either a highly transparent film or a compensation film.

3. The method of claim 1, wherein the second substrate is either a compensation film or a film of a same material as the first substrate.

4. The method of claim 1, wherein the liquid crystal substance is formed on the first substrate via slot die or roll coating.

5. The method of claim 1, wherein the liquid crystal substance is a cholesteric liquid crystal phase liquid crystal chemical compound or mixture.

6. The method of claim 1, wherein not all of the photopolymerizable liquid crystal substance is photopolymerizable, and a portion is comprised of oligomer substance.

7. The method of claim 1, wherein the liquid crystal state is within about 10° C. through 160° C., maintained via a hot melt treatment.

8. The method of claim 1, wherein the lamination process is achieved via two rollers rotating with counter directions and defining a spacing there between where the sandwich structure is passed through, the spacing between the rollers controlling a thickness of the liquid crystal, wherein the rollers are maintained at a given temperature, thereby ensuring the application of a shear stress on the liquid crystal.

* * * * *